US011836057B2

(12) United States Patent
Deneuve et al.

(10) Patent No.: US 11,836,057 B2
(45) Date of Patent: Dec. 5, 2023

(54) FAULT LOCATION IN A REDUNDANT ACQUISITION SYSTEM

(71) Applicant: SAFRAN AIRCRAFT ENGINES, Paris (FR)

(72) Inventors: Sébastien Jean Fernand Deneuve, Moissy-Cramayel (FR); Charles Ying, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 53 days.

(21) Appl. No.: 17/438,022

(22) PCT Filed: Mar. 12, 2020

(86) PCT No.: PCT/FR2020/050523
§ 371 (c)(1),
(2) Date: Sep. 10, 2021

(87) PCT Pub. No.: WO2020/183113
PCT Pub. Date: Sep. 17, 2020

(65) Prior Publication Data
US 2022/0147425 A1     May 12, 2022

(30) Foreign Application Priority Data

Mar. 12, 2019     (FR) ...................... 1902477

(51) Int. Cl.
*G06F 11/16* (2006.01)
*G05B 23/02* (2006.01)

(52) U.S. Cl.
CPC ........ *G06F 11/165* (2013.01); *G05B 23/0213* (2013.01); *G05B 23/0275* (2013.01); *G05B 23/0289* (2013.01)

(58) Field of Classification Search
CPC .............. G06F 11/165; G05B 23/0213; G05B 23/0275; G05B 23/0289
(Continued)

(56) References Cited

U.S. PATENT DOCUMENTS

| 2013/0293325 A1* | 11/2013 | Becker | G01R 1/206 335/207 |
| 2014/0236415 A1* | 8/2014 | Foiret | G05B 23/0232 701/29.1 |
| 2020/0286574 A1* | 9/2020 | Kunz | G05F 1/613 |

FOREIGN PATENT DOCUMENTS

| EP | 2 034 409 A1 | 3/2009 |
| GB | 2 260 430 A | 4/1993 |
| WO | 2013/038091 A1 | 3/2013 |

OTHER PUBLICATIONS

Search Report dated Nov. 28, 2019 from the French Intellectual Property Office in FR Application No. 1902477.
(Continued)

*Primary Examiner* — Yair Leibovich
(74) *Attorney, Agent, or Firm* — Sughrue Mion, PLLC

(57) ABSTRACT

A method detects and localizes a failure of a measurement acquisition channel in an acquisition system including two redundant acquisition channels for the measurement of a physical quantity in an environment. The method uses a processor with a memory storing a model including modeled values of the physical quantity based on measurements of other physical quantities in the environment. The method includes detecting a symptomatic error of a defective acquisition channel when a deviation between the measured values of the two channels reaches a detection threshold, waiting to let the acquisition system evolve for a certain period, and localizing the defective channel among the two channels, when the deviation of the values measured between the channels reaches a localization threshold dif-
(Continued)

ferent from the detection threshold. The localization is made from the comparison of the measured value of each of the channels with a modeled value of the physical quantity.

11 Claims, 2 Drawing Sheets

(58) Field of Classification Search
USPC .......................................................... 714/11
See application file for complete search history.

(56) References Cited

OTHER PUBLICATIONS

International Search Report dated Jul. 9, 2020 from the International Searching Authority in International Application No. PCT/FR2020/050523.

* cited by examiner

FAULT LOCATION IN A REDUNDANT ACQUISITION SYSTEM

CROSS REFERENCE TO RELATED APPLICATIONS

This application is a National Stage of International Application No. PCT/FR2020/050523 filed Mar. 12, 2020, claiming priority based on French Patent Application No. 1902477 filed Mar. 12, 2019, the entire contents of each of which being herein incorporated by reference in their entireties.

GENERAL TECHNICAL FIELD

The invention relates to the management of failures in duplex acquisition systems (also called redundant acquisition systems).

The invention will be illustrated within the general framework of a turbomachine of an aircraft but is applicable to any duplex acquisition system.

The acquisition system measures, for example, the position of a valve, the stroke of a cylinder, etc.

PRIOR ART

An engine fitted to a single-engine aircraft is generally more safety-constrained than within the framework of a twin-engine application. Indeed, for a twin-engine application, an engine shutdown is an event with less criticality than for a single-engine application where the event is classified as very dangerous since a loss of the thrust of the single engine causes the loss of the propulsion of the aircraft.

The management of the failures for such an application therefore needs to be adapted in order to avoid unacceptable thrust losses as much as possible (called LOTC: Lost Of Thrust Control). The acquisitions that can generate a LOTC are generally physically redundant (duplex acquisitions) in order to prevent a simple electrical failure from leading to the LOTC (CS-E 50 certification requirement for example).

The mechanical or electrical or electronic system or any combination involved in the duplex acquisition is therefore redundant: it comprises at least two channels A and B performing the same acquisition function.

The physical redundancy allows detecting the simple failures and accommodating thereto. Indeed, a deviation test $\Delta$ between the channels A and B (for example the calculation of the deviation between the values measured by each channel A, B, such as intensity or voltage, or their corresponding digital signals) is generally performed on the acquisitions in the regulation program to detect these simple failures.

FIG. 1 illustrates this method. It will be described later.

This deviation test $\Delta$ calculates the deviation $\Delta$ between the channels A, B and compares it with a predefined detection threshold Th_D:
- If the deviation $\Delta$ between the channels A and B is below the detection threshold Th_D, it is considered that there is no failure (either the two channels A, B are indeed intact, or one channel is slightly faulty but the failure is small enough to have no impact at the engine level),
- If the deviation $\Delta$ between the channels A and B is greater than the detection threshold Th_D, it is considered that there is a failure on one of the two channels A, B since this deviation $\Delta$ is too large to reflect an actual physical behavior of the engine. A failure is then said to be detected.

Once detected, it is then necessary to localize the failure i.e. to determine the faulty channel among the two tested channels.

Generally, the localization is made simultaneously upon detection by making a three-way vote with an arbitration model: using a model of the measured physical quantity (the model providing modeled values of the physical quantity which have been developed from the measurements of other physical quantities in the environment of the engine), the channel A, B closest to this model, i.e. the channel A, B whose acquired value is closest to the modeled value of the physical quantity, is considered valid.

In other words, when a failure is detected and the channel A (respectively B) is close to the model, then the channel B (respectively A) is considered to be faulty and the channel A (respectively B) is selected. For example, this selection means that it will be the channel A that will be used for all the other actions concerning the aircraft. The channel B is functionally ignored.

The problem with this strategy is that the accuracy of the model is generally much lower than the accuracy of the sensor, which can quickly lead to wrong localizations.

The example below will illustrate this situation.

In practice, the value selected for the various processing operations subsequent to the acquisition (use of the measurements acquired in other calculations, etc.) is generally the arithmetic mean between the channels A, B in nominal operation (i.e. when the two channels A and B are intact), which then allows halving the impact of a failure of one of the two channels on the selected value (in FIG. 1, the dotted line up to t=t1). However, in case of wrong localization (i.e. if in case of failure, the faulty channel is selected), the error is taken in full, which is the most unfavorable case.

Indeed, if it is considered that Intact_channel=Acutal_value and

Faulty_channel=Acutal_value+Fault, it is indeed observed that the selection of the faulty channel is more unfavorable than the absence of accommodation.

If the intact channel is chosen, then
Selected_value=Intact_channel=Acutal_value
is obtained
If the mean between the channels is chosen, then
Selected_value=½ (Intact_channel+Faulty_channel)
=½ (Acutal_value+Acutal_value+Fault)
=Acutal_value+½ Fault
is obtained
If the faulty channel is chosen, then
Selected_value=Faulty_channel=Acutal_value+Fault
is obtained Thus, in case of wrong selection, the fault is experienced in its entirety, against only half of the fault in the case of taking the mean into account.

In the example of FIG. 1, a sensor with a drifting B channel is considered. It is assumed that a feared event (LOTC for example) occurs in case of mistake by 8K on the measurement (fault threshold Th_Err).

A detection threshold of the deviation between the channels ("cross-check" threshold) Th_D of 1K is defined (design parameter) and the localization is required to be made at the same time as the detection. In addition, in nominal operation, the mean between the channels A, B is selected.

At time t0, one of the two drift channels (assuming it is channel B). The selected curve, which corresponds to the mean at nominal speed, drifts twice as slowly (in FIG. 1, the dotted line up to t=t1). At t1, the channel B reaches the detection threshold. As the sensors of the channels A and B are accurate, this detection is reliable (i.e. there is actually a problem).

As the localization must also be made at t1, it is necessary to compare the channels A and B with the model. On the other hand, as the detection was made very early (with a small deviation Δ), the "wrong" accuracy of the model does not always allow discriminating the faulty channel from the intact channel. Thus, if the selection is on the channel B, the selected curve B will reach the threshold of the event Th_Err more quickly than if the selected curve had remained that of the mean of the channels A, B. The right channel A has therefore been rejected and the situation is immediately deteriorated.

It is then observed that in some cases, a too hasty localization leads to amplify a phenomenon which would have been weaker without action.

It would therefore be preferable to define the right time for the localization in order to minimize the probability of wrong localization.

Finally, another approach sometimes used is not to detect a failure as long as it cannot be localized. The disadvantage in this case is that the detection of the failure is delayed.

The invention proposed subsequently defines a strategy which allows greatly reducing the number of false localizations and therefore leads to safer regulation systems.

PRESENTATION OF THE INVENTION

The invention starts from the observation that the wrong localization rate is relatively high with the current failure management strategy. Indeed, the failure detection and localization are made simultaneously while these two phases do not meet the same need:
- the detection is an operation essentially based on the accuracy of the sensors and the detection threshold is generally determined by this accuracy,
- the localization is an operation based on the accuracy of the arbitration model, during which it is sought to evaluate the most likely true channel by relying on the output of the model.

The detection and localization phases therefore have every interest in being distinguished because they are not directed by the same dimensioning parameters. When a failure is of relatively low amplitude, it is safer not to accommodate it (conservation of the mean between the channels) than to seek to localize it while taking a significant risk of mistake.

In this regard, according to a first aspect, the invention proposes a method for detecting and localizing a failure in an acquisition system comprising two redundant acquisition channels for the measurement of a physical quantity in an environment, the method using a calculation unit comprising a memory storing a model of the measured physical quantity, said model providing modeled values of the physical quantity based on measurements of other physical quantities in said environment, the method implementing the following steps:
(E1) detecting a symptomatic error of a defective acquisition channel when a deviation between the measured values of the two channels (A, B) reaches a detection threshold,
(E2) waiting to let the acquisition system evolve for a certain period of keeping the error under control,
(E3) localizing the defective channel among the two channels, when the deviation of the values measured between the channels reaches a localization threshold, said localization being made from the comparison of the measured value of each of the channels with a modeled value of the physical quantity, the localization threshold being different from the detection threshold.

The period T is preferably non-zero. It corresponds to a period of harmlessness of the error.

In one embodiment, the calculation unit generates a working data which takes into account the values of the two acquisition channels as long as the localization step (E3) is not triggered, said method comprising a step of:
(E4) selecting the non-defective channel as the working quantity once the defective channel localization step (E3) has been carried out.

In one embodiment, a fault threshold is predefined and the calculation unit generates a working data which takes into account the values of the two acquisition channels as long as the localization step (E3) is not triggered, and in which the localization threshold is chosen so that the deviation between the values of the two channels can exceed the fault threshold but so that the deviation between the working data and the value of either of the two channels cannot exceed the fault threshold.

In one embodiment, the localization threshold is greater than a fault threshold.

In one embodiment, the working quantity corresponds to an output quantity of the unit for the subsequent processing by other calculators.

In one embodiment, the working quantity corresponds to an arithmetic mean of the quantities of the channels.

In one embodiment, the localization threshold is comprised (preferably strictly) between the fault threshold and twice the fault threshold.

In one embodiment, a step of notifying the detection is issued by the calculation unit before the implementation of the localization step (E4), preferably at the time of the detection step (E3), to provide information on a state of detected but non-localized failure.

In one embodiment, the detection threshold and/or the localization threshold and/or the fault threshold and/or the model of the physical quantity is/are a function of the operating ranges of the acquisition system and/or of the accuracy of the model.

In one embodiment, the detection threshold is set based on the sensor specifications of both channels.

In one embodiment, the thresholds and the deviations are expressed in absolute value (and are therefore positive).

According to a second aspect, the invention proposes a calculation unit for the detection and localization of failure of a measurement acquisition channel in an acquisition system comprising two redundant acquisition channels for the measurement of a physical quantity in an environment, the calculation unit comprising a memory (24) storing a model (Mod) of the measured physical quantity, said model providing modeled values of the physical quantity based on measurements of other physical quantities in said environment, the calculation unit being configured to receive measurement data from the acquisition channels of the acquisition system, the calculation unit being configured to implement the steps of the method described above, i.e. in particular the following steps:
(E1) detecting an error when the deviation between the measured values of the two channels crosses a detection threshold,
(E2) waiting to let the acquisition system evolve for a certain period of time,
(E3) localizing the defective channel among the two channels, when the deviation of the values measured between the channels crosses a localization threshold, said localization being made from the comparison of the measured value of each of the channels with a modeled value of the physical quantity, the localization threshold being different from the detection threshold.

According to a third aspect, the invention proposes an assembly comprising a calculation unit as described above and a duplex acquisition system.

According to a fourth aspect, the invention proposes a method for localizing a failure in an acquisition system comprising two redundant acquisition channels for the measurement of a physical quantity in an environment, the method using a calculation unit comprising a memory storing a model of the measured physical quantity, said model providing modeled values of the physical quantity based on measurements of other physical quantities in said environment, the method implementing the following steps:

(E3) localizing the defective channel among the two channels, when a deviation of the measured values between the channels reaches a localization threshold, said localization being made from the comparison of the measured value of each of the channels with the model of the channel stored in the memory, in which a fault threshold is defined and the calculation unit generates a working data which takes into account the values of the two acquisition channels as long as the localization step (E3) is not triggered, and in which the localization threshold is chosen so that the deviation Δ between the values of the two channels can exceed the fault threshold but that the deviation between the working data and either of the two channels cannot exceed the fault threshold (preferably the largest deviation among the two deviations).

The localization step here involves the detection step.

According to a fifth aspect, the invention proposes a calculation unit for the detection and localization of failure in an acquisition system comprising two redundant acquisition channels for the measurement of a physical quantity in one environment, the calculation unit comprising a memory storing a model of the measured physical quantity, said model providing modeled values of the physical quantity based on measurements of other physical quantities in said environment, the calculation unit being configured to receive measurement data from the acquisition channels of the acquisition system, the calculation unit being configured to implement the steps of the method described above, i.e. in particular the following steps:

(E3) localizing the defective channel among the two channels, when a deviation of the measured values between the channels reaches a localization threshold, said localization being made from the comparison of the measured value of each of the channels with the model of the stored channel in the memory, in which a fault threshold is defined and the calculation unit generates a working data which takes into account the values of the two acquisition channels as long as the localization step (E3) is not triggered, and in which the localization threshold is chosen so that the deviation Δ between the values of the two channels can exceed the fault threshold but that the deviation between the working data and either of the two channels cannot exceed the fault threshold (preferably the largest deviation among the two deviations).

PRESENTATION DES FIGURES

Other characteristics, aims and advantages of the invention will emerge from the following description, which is purely illustrative and not limiting, and which should be read with reference to the appended drawings, in which.

DETAILED DESCRIPTION

Figure 1:
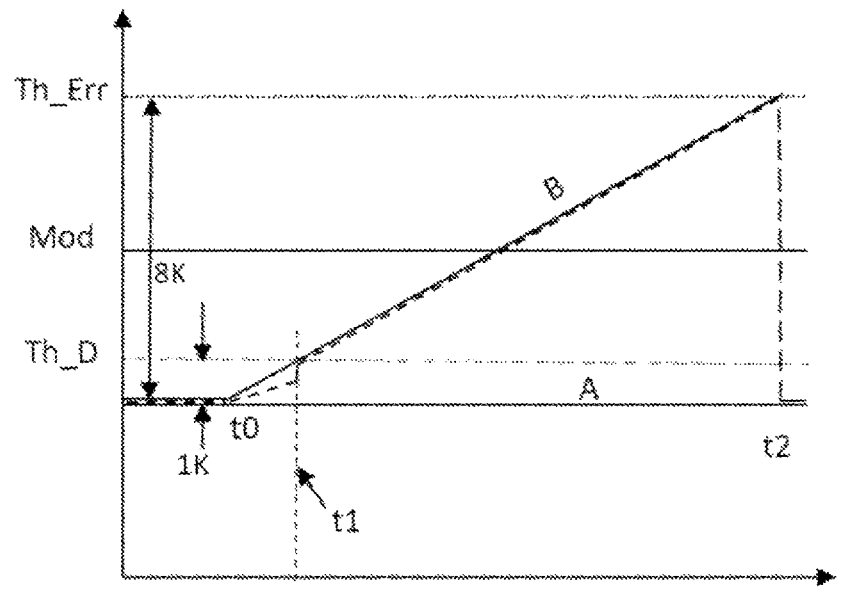
FIG. 1 illustrates a known detection and localization method.
Figure 2:
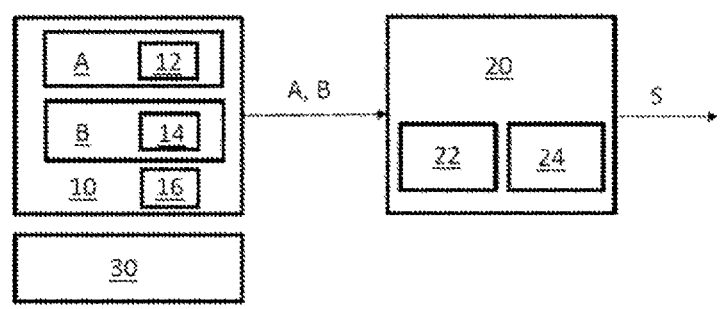
FIG. 2 illustrates an assembly for implementing the invention.

FIG. 2 illustrates an assembly comprising a duplex or redundant acquisition system 10 and a calculation unit 20 able to receive data from the acquisition system 10.

The acquisition system 10 comprises a first channel A and a second channel B for measuring data relating to a mechanical, electronic, electrical and/or hydraulic device 30. The channels A, B are intended to measure the same physical quantity of the same device 30. The channels A and B each comprise for that at least respectively one sensor 12, 14 (voltage, magnetic field, temperature, torque, force sensor, etc.).

The sensors 12, 14 of the two channels A, B then send their data to the calculation unit 20. The data are generally in the form of an electrical voltage value indicative of the parameter that the sensors 12, 14 are measuring. The data can be transmitted in a digital or analog manner. Particularly, the data can be pre-processed (filtering, smoothing, etc., either at the level of the sensor or at the level of the calculation unit 20) in order to be able to be used in the case of a method in accordance with the different embodiments of the invention.

The acquisition system 10 can thus comprise a processing module 16 to perform the pre-processing of the data from the channels A, B so that the calculation unit 20 receives data that can be used directly.

The calculation unit 20 comprises a processor 22 able to process data (for example calculate the differences between the values of the acquisition channels A, B, calculate a new quantity from these acquisition channels A, B, calculate a mean, etc.) and perform calculations, and further comprises a memory 24. The processor 22 can communicate with the memory 24.

The calculation unit 20 also has the function of generating a working data S, which is then used by the other calculators of the aircraft. The working data S corresponds to a function of the values of the acquisition channels A, B, which can be written in the form S=f(A,B). The principle of redundancy calls for a principle of symmetry in the function f (because the two channels A, B are generally preferably undifferentiated and neither is privileged over the other) therefore a function f such that f(A,B)=f(B,A) is preferably chosen. This may not be the case: sometimes, for certain temperatures, it is preferred to favor the maximum between the channels for protection against over-temperatures.

In a preferred embodiment, the function f is a mean and S=moy_AB=(A+B)/2 is obtained. This means that the working data S corresponds to the mean of the values of the acquisition channels A and B.

The memory 24 stores a computer model Mod of the quantity measured by the channels A, B. This model has been developed beforehand from other measurements.

As indicated previously, the accuracy of the sensors 12, 14 is better than that of the model Mod.

The calculation unit 20 can group together several calculation sub-units, in particular in the case where the tasks are shared between different calculators or computers.

The acquisition channels A, B acquire continuously (or at regular intervals) data relating to the device 30. These data are sent to the calculation unit 20 which calculates in particular a deviation Δ between the measured values of the channels A, B. This deviation Δ can be in absolute or relative (positive or negative) value. To illustrate some situations in the present description, it will be considered that the acquired values verify the following definition of Δ: B=A+Δ.

A fault threshold Th_Err is defined from which it is considered that the deviation Δ on the measurement, following a failure, may cause a feared or unwanted event (LOTC for example). This means that if the working data S corresponds to the defective acquisition channel (therefore to be avoided), there is a risk of causing the unwanted event.

Figure 3:
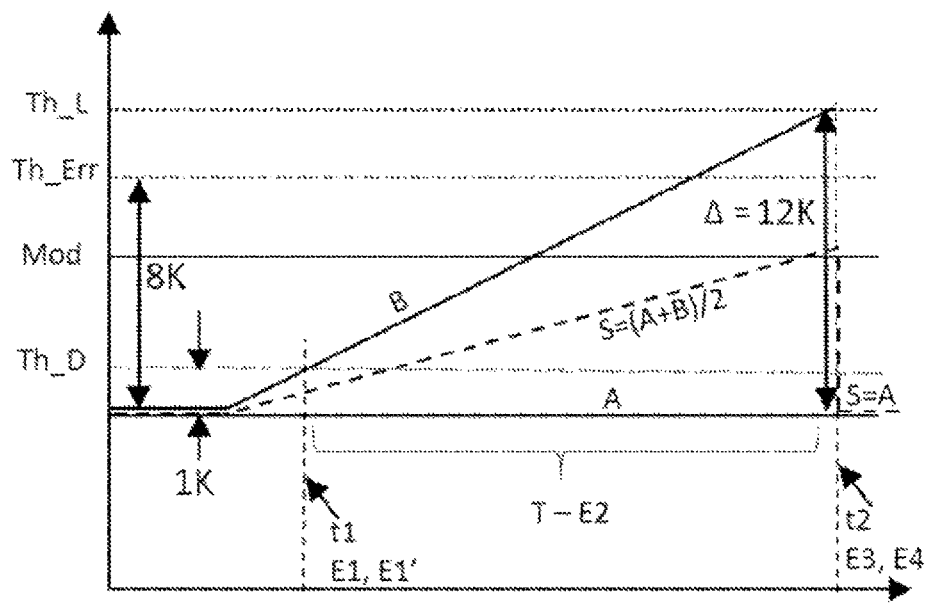
FIG. 3 illustrates a method in accordance with one embodiment of the invention.

FIG. 3 graphically illustrates the different steps of the detection and localization method, this method will be described. A fault threshold of 8K is here assumed.

In a first step E1, an error, following a fault, is detected when the deviation Δ reaches a detection threshold Th_D (1K in FIG. 3). The error is symptomatic of a faulty acquisition channel. The data relating to the detection threshold Th_D is typically stored in the memory 24. The detection threshold Th_D depends on the acquisition system 10, including in particular the specifications of the sensors 12, 14 (therefore of their accuracy).

Step E1 is implemented by the calculation unit 20. In FIG. 3, step E1 occurs at t1.

Optionally, a notification step E1' is triggered by the calculation unit 20 to provide information according to which an error has been detected. The error detection information can be used by a computer, another module of the calculation unit 20, or by a human operator, etc.). Consequently, there is error detection information relating to the acquisition system indicating that one of the two channels A, B is defective, but without being able at this stage to identify which one.

Then, a waiting step E2 is carried out, which simply corresponds to a wait to let the system evolve for a period T. During this waiting step E2, the failure is known but under control, i.e. it is known that the generated error will not lead to the feared event: it is therefore a period of keeping the error under control or a period of harmlessness of the error. The period T lasts until a step of localizing E3 the defective channel is triggered (see FIG. 3). The period T is typically non-zero (except in case of clear failure, where a channel moves instantaneously).

The localization step E3 is carried out when the deviation Δ of the measured values between the channels A, B reaches a localization threshold Th_L (FIG. 3). The localization is made by comparing the values measured for the channels A, B with the model Mod of the channels A, B stored in the memory 24. Typically, the channel A, B considered as non-defective is the one which is the closest to the model Mod. The closest means that the deviation between the values is the smallest.

Step E3 is implemented by the calculation unit 20. In FIG. 3, step E3 occurs at t2.

Thanks to the wait E2, the deviation Δ has been able to grow since the detection step E1 (for example in case of sensor gain drift), which means that the identification of the channel is made with less risk of error despite the inaccuracy of the model Mod.

Naturally, the localization threshold Th_L has a value different from that of the detection threshold Th_D, otherwise the same risks of error related to an early localization would be present.

In addition, as the detection E1 has been made upstream, a new state of detected but non-localized failure is created. There is thus a preventive detection which can cause the establishment of some preventive measurements: not taking into account the data generated by the acquisition system 10 or maintenance operation. Indeed, even if the risk of mistake on the channels A, B is high at this stage, the criticality in maintenance is much lower than during operation. It is therefore reasonable within this framework to try to localize the error earlier.

Once the localization E3 has been made and the defective channel has been identified (or concomitantly), a selection step (also called accommodation) E4 of the non-defective channel is implemented. This means that the working data S of the calculation unit 20 becomes the non-defective acquisition channel—the other channel being ignored.

The selection step E4 is implemented by the calculation unit 20. In FIG. 3, the step E4 also occurs at t1.

There are therefore two thresholds to be set: the detection threshold Th_D and the localization threshold Th_L. The detection threshold Th_D only depends on the sensor specifications.

On the other hand, the value of the localization threshold Th_L remains to be determined, which requires knowing the time that would lead up to the feared event without accommodation.

In practice, as was indicated earlier, the working data S corresponds to the mean Moy_AB of the acquisition channels A, B. By definition, if there is a mistake on the measurement of a deviation Δ equal to Th_Err and if the working data S corresponds to the defective channel, there is a risk of ending up with the feared event.

However, as long as the defective acquisition channel has not been localized, the failure has a halved impact (because the working data S is the mean Moy_AB between the two channels A, B).

Consequently, the risk only occurs when S−A=Moy_AB−A=Th_Err−A. Th_Err−A=(A+B)/2−A=(A+A+Δ)/2−A=Δ/2, namely Δ=2Th_Err, is thus obtained.

It is therefore possible to implement the localization step E3 only when the deviation Δ between the channels reaches 2Th_Err, i.e. as late as possible. This value being extreme, the application of a safety margin means sought to be localized when the deviation Δ between the channels reaches Th_L such that Th_Err<Th_L≤2Th_Err.

In other words, as Th_L>Th_Err (Th_L is strictly greater than Th_Err), the deviation Δ between the channels A, B will be caused to exceed the fault threshold Th_Err during the waiting step E2. On the other hand, as Th_L≤2Th_Err, the working data S=Moy_AB indeed keeps a deviation with the channel A (or moreover the channel B, in absolute value, because the function is the mean function) lower than Th_Err during the whole waiting phase E2, which means that the risk that the feared event occurs is avoided. If Th_L=2Th_Err, the localization step is triggered at the time when the working data S=Moy_AB reaches a deviation with the channel A which is Th_Err. If Th_L<2Th_Err, then the working data S=Moy_AB keeps a deviation with the channel A which will always be less than Th_Err.

As other output data S are possible (use of functions f other than the mean), the principle can be immediately generalized: a localization threshold Th_L is chosen so that the deviation between the values of the two channels A, B can exceed the fault threshold Th_Err but so that the deviation between the working data S and either of the two channels A, B (the two deviations can be calculated and the maximum of the deviations can be taken) cannot exceed the fault threshold Th_Err.

In this way, "at the latest" is localized when the error on the faulty acquisition channel is maximum, which greatly reduces the probability of wrong localization.

The values of the thresholds Th_Err, Th_L_, Th_D are stored in the memory 24 of the calculation unit 20. The thresholds are here expressed in absolute value, i.e. they are positive.

As specified above, the thresholds and the deviations are advantageously expressed in absolute value, so as not to depend on the signs of the acquired data. It is however possible to work outside the absolute value: the signs and the (increasing or decreasing) evolutions of the data must then be taken into account.

Thanks to the method described, the maximum tolerances on the acquisition are used as much as possible before the localization step E3 for accommodation as needed. Consequently, the more this criticality will be mastered, the more the failure management performance can be improved.

Finally, the operation of the acquisition system 10 and/or the accuracy of the model Mod may vary based on the operating regime of the device 30. In this case, different values of each threshold Th_Err, Th_L and/or Th_D, and/or the model Mod can be stored in a table in the memory 24, based on the operating ranges of the acquisition system 10 and/or on the accuracy of the model.

The invention claimed is:

1. A method for detecting and localizing a failure of a measurement acquisition channel in an acquisition system comprising two redundant acquisition channels for a measurement of a physical quantity in an environment, the method using a calculation unit comprising a memory storing a model of a measured physical quantity, said model providing modeled values of the physical quantity based on measurements of other physical quantities in said environment, the method comprising the following steps:
   detecting a symptomatic error of a defective acquisition channel when a deviation between measured values of the two redundant acquisition channels reaches a detection threshold;
   waiting to let the acquisition system evolve for a certain period of keeping the symptomatic error under control;
   localizing the defective acquisition channel among the two redundant acquisition channels, when the deviation reaches a localization threshold, said localization being made from a comparison of the measured value of each of the two redundant acquisition channels with a modeled value of the physical quantity,
   the localization threshold being different from the detection threshold.

2. The method according to claim 1, wherein the calculation unit generates working data which takes into account the measured values of the two redundant acquisition channels as long as the localization step is not triggered, said method further comprising a step of:
   selecting a non-defective channel as a working quantity once the localization step has been carried out.

3. The method according to claim 2, wherein the working quantity corresponds to an arithmetic mean of quantities of the two redundant acquisition channels.

4. The method according to claim 1, wherein a fault threshold is predefined and the calculation unit generates working data which takes into account the measured values of the two redundant acquisition channels as long as the localization step is not triggered, and wherein the localization threshold is chosen so that the deviation between the measured values of the two redundant acquisition channels can exceed the fault threshold but a deviation between the working data and the measured value of either of the two redundant acquisition channels cannot exceed the fault threshold.

5. The method according to claim 4, wherein the localization threshold is greater than the fault threshold.

6. The method of claim 5, wherein the localization threshold is between the fault threshold and twice the fault threshold.

7. The method according to claim 1, further comprising notifying the detection of the defective acquisition channel before the localization step to provide information on a state of a detected but non-localized failure.

8. The method according to claim 7, wherein the calculation unit notifies the detection at the time of the detection step.

9. The method according to claim 1, wherein the detection threshold and/or the localization threshold and/or a fault threshold and/or the model of the physical quantity is/are a function of operating ranges of the acquisition system and/or of an accuracy of the model.

10. The method according to claim 1, wherein the detection threshold is set based on sensor specifications of both of the two redundant acquisition channels.

11. A calculation unit for detection and localization of failure of a measurement acquisition channel in an acquisition system comprising two redundant acquisition channels for a measurement of a physical quantity in an environment, the calculation unit comprising a memory storing a model of a measured physical quantity, said model providing modeled values of the physical quantity based on measurements of other physical quantities in said environment, the calculation unit being configured to receive measurement data from the two redundant acquisition channels of the acquisition system,
   the calculation unit being configured to execute the following steps:
   detecting a symptomatic error of a defective acquisition channel when a deviation between measured values of the two redundant acquisition channels crosses a detection threshold,
   waiting to let the acquisition system evolve for a certain period of keeping the symptomatic error under control,
   localizing a defective channel among the two redundant acquisition channels, when the deviation crosses a localization threshold, said localization being made from a comparison of the measured value of each of the two redundant acquisition channels with a modeled value of the physical quantity,
   the localization threshold being different from the detection threshold.

* * * * *